(12) United States Patent
Suerbaum et al.

(10) Patent No.: US 9,572,046 B2
(45) Date of Patent: Feb. 14, 2017

(54) PLMN OPERATION MANAGEMENT (71) Applicant: NOKIA SIEMENS NETWORKS OY, Espoo (FI)

(72) Inventors: Clemens Suerbaum, Munich (DE); Jan Mikael Rutanen, Tampere (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 81 days.

(21) Appl. No.: 13/871,197

(22) Filed: Apr. 26, 2013

(65) Prior Publication Data
US 2014/0323118 A1 Oct. 30, 2014

(51) Int. Cl.
H04W 24/02 (2009.01)

(52) U.S. Cl.
CPC .................... *H04W 24/02* (2013.01)

(58) Field of Classification Search
CPC ...... H04W 24/00; H04W 24/02; H04W 24/04; H04W 84/04; H04W 8/22; H04W 84/042
USPC ...................... 455/412.2, 423, 424
See application file for complete search history.

(56) References Cited

U.S. PATENT DOCUMENTS

| 6,377,978 | B1 * | 4/2002 | Nguyen | 709/206 |
|---|---|---|---|---|
| 6,918,038 | B1 * | 7/2005 | Smith | G06F 8/65 709/223 |
| 2002/0002468 | A1 * | 1/2002 | Spagna et al. | 705/1 |
| 2004/0215650 | A1 | 10/2004 | Shaji et al. | |
| 2009/0064143 | A1 * | 3/2009 | Bhogal et al. | 718/100 |
| 2009/0119655 | A1 | 5/2009 | Quilty | |
| 2009/0183073 | A1 * | 7/2009 | Scriver et al. | 715/711 |
| 2010/0002603 | A1 * | 1/2010 | Gupta et al. | 370/254 |
| 2011/0099503 | A1 * | 4/2011 | Golani et al. | 715/772 |
| 2011/0302524 | A1 * | 12/2011 | Forstall | 715/781 |

OTHER PUBLICATIONS

ETSI TS 132 532 V9.2.1 (Jan. 2010) Universal Mobile Telecommunications System (UMTS); LTE; Telecommunication management; Software management Integration Reference Point (IRP); Information Service (IS) (3GPP TS 32.532 version 9.2.1 Release 9).*

ETSI TS 132.101 V11.1.0, Technical Specification, "Digital Cellular Telecommunications System (Phase 2+); Universal Mobile Telecommunications System (UMTS); LTE; Telecommunication Management; Principles and High Level Requirements (3GPP TS 32.101 version 11.1.0 Release 11)," Jan. 2013, 69 pages.

ETSI TS 132.532 V11.0.0, Technical Specification, "Universal Mobile Telecommunications System (UMTS); LTE; Telecommunication Management; Software Management (SwM); Integration Reference Point (IRP); Information Serivce (IS) (3GPP TS 32.532 version 11.0.0 Release 11)," Sep. 2012, 52 pages.

(Continued)

*Primary Examiner* — Marisol Figueroa
(74) *Attorney, Agent, or Firm* — Squire Patton Boggs (US) LLP (57) ABSTRACT

A network management function of a public land mobile network is provided with one or more notifications of the extent of progress of an operation, from another management function of the public land mobile network, in accordance with one or more input parameters. The operation is performed remotely from the network management function.

18 Claims, 9 Drawing Sheets

(56) References Cited

OTHER PUBLICATIONS

ETSI TS 132.662 V11.1.0, Technical Specification, "Digital Cellular Telecommunications System (Phase 2+); Universal Mobile Telecommunications System (UMTS); LTE; Telecommunication management; Configuration management (CM); Kernel CM Information Service (IS) (3GPP TS 32.662 version 11.1.0 Release 11)," Feb. 2013, 25 pages.

International Search Report application No. PCT/EP2013/058678 dated Aug. 8, 2013.

* cited by examiner

5.8.1.2 Input parameters

| Parameter Name | Qualifier | Information type | Comment |
|---|---|---|---|
| swToBeInstalled | M | swLocation | swLocation denotes a unique location (local or remote) of software which can be a directory path or a URL and includes 1) the name of software or 2) a software version |
| neIdentifier | M | Distinguished Name (DN) | Identifies the destination where the NE software needs to be installed. This is a full Distinguished Name according to 3GPP TS 32.300 |
| progressNotificationControl | O | Choice of intervalDuration (Integer) percentageStepSize (Integer) percentageThreshold (Integer) completionTimeCondition (time) stepNumberCondition (Integer) listOfStepNumbers reportEveryStep | Specifies the timing at which progress notifications are made |

5.8.1.3 Output parameters

| Parameter Name | Qualifier | Matching Information | Comment |
|---|---|---|---|
| installProcessId | M | Integer | An Identifier generated by IRPAgent upon receiving a non-automated software management request from IRPManager. In this case, it identifies the NE software installation operation request. |
| result | M | ENUM { requestAccepted, requestFailed, notAllowedBecauseOfOngoingSwmActivity } | Indicates whether SwMIRP has accepted or rejected the installation request.<br><br>It can have any one of the three possible values:<br>- "requestAccepted" which means that IRPAgent uld perform the NE software installation operation<br>- "requestFailed" which means that IRPAgent has failed to initiate the NE software installation operation. Specific error condition can be captured in reason field<br>- notAllowedBecauseOfOngoingSwmActivity which means that the operation is rejected because automatic SWM is ongoing for the requested NE. |
| totalNumberOfSteps | O | Integer | Indicates the total number of steps, which could be reported by progress notifications. |
| reason | O | String | To capture detailed error conditions. The field is empty when there is no error. |

Figure 4

5.11.3.2 Input parameters

| Parameter Name | Qualifier | Matching Information | Comment |
|---|---|---|---|
| objectClass | M, Y | SwMManagedEntity.objectClass | Represents the network element object class generating this event. Also refer to Notification header [9]. |
| objectInstance | M, Y | SwMManagedEntity.objectInstance | Represents the network element instance generating the event. Also refer to Notification header [9] |
| notificationId | O, N | -- | Refer to Notification header [9]. |
| eventTime | M, Y | -- | Refer to Notification header [9]. |
| systemDN | C, Y | -- | Refer to Notification header [9]. |
| notificationType | M, Y | "notifyInstallNESwProgress" | |
| installProcessId | M, Y | integer | To allow IRPManager correlate this notification with the installNESw operation request. Also refer to section 5.7.1.3 of 3GPP 32.532 |
| progressInformation | M, Y | CHOICE ( percentage; stepNumber ) | Provides information on the progress of installNESw operation for the network element involved. Percentage is provided, if progressNotificationControl in operation had one of the values intervalDuration, percentageStepSize, percentageThresholds, completionTimeCondition else stepNumber is provided. |

5.11.3.3 Triggering Event

5.11.3.3.1 From State
progressReportingRequested

| Assertion Name | Definition |
|---|---|
| progressReportingRequested | IRPAgent has accepted the corresponding operation request and progressNotificationControl was present in the operation request |

5.11.3.3.2 To State
progressReportingTriggerConditionWasMet

| Assertion Name | Definition |
|---|---|
| progressReportingTriggerConditionWasMet | Trigger condition defined in the corresponding progressNotificationControl was met. |

Figure 5

| requestIdentifier | CM*1 | Integer | A unique identifier for the installNESw operation. This identifier is copied into a notifyOperationProgress notification and into a cancelOperation operation. |
|---|---|---|---|

*1) Condition: parameter must be present if cancelOperation operation is supported

Figure 6

5.12.3.2 Input parameters

| Parameter Name | Qualifier | Information type | Comment |
|---|---|---|---|
| requestIdentifier | M | See 5.7.1.2 | This attribute identifies the installNESw operation instance which is to be cancelled. |

5.12.3.3 Output parameters

| Parameter Name | Qualifier | Matching Information | Comment |
|---|---|---|---|
| latestSWVersion | CM *) | swVersion | This parameter denotes the latest software version which had been downloaded to the NE indicated by neIdentifier in the installNESw operation of the same requestIdentifier.<br>A value is supplied in case the result is either success or installationCompleted. |
| Result | M | ENUM<br>(<br>success,<br>installationCompleted,<br>failureNoSuchRequestIdentifier,<br>failureResourceLimitation,<br>failure<br>) | Indicates the result of the cancelInstallNESw request. |
| Reason | O | String | To capture detailed error reason. The field is empty when there is no error. |

*1) Condition: Parameter must be present, if result is either success or installationCompleted.

5.12.3.4 Pre condition

| Assertion Name | Definition |
|---|---|
| installNESwStarted | installNESw operation of the same requestIdentifier has been requested. |

5.12.3.5 Post-condition

| Assertion Name | Definition |
|---|---|
| installNESwStopped | installNESw operation of the same requestIdentifier has been stopped. |

5.12.3.6 Exceptions

| Exception Name | Definition |
|---|---|
| operationFailed | Condition: Pre-condition is false or post-condition is false.<br>Returned Information: The output parameter status report has value failure or failureNoSuchRequestIdentifier<br>Exit state: Entry state. |
| resourceLimitation | Condition: Operation not performed due to resource limitation.<br>Returned Information: The output parameter report has value failureResourceLimitation.<br>Exit state: Entry state. |

Figure 7

7.9.1.2 Input parameters [this is the 3GPP terminology for the notification payload]

| Parameter Name | Qualifier | Matching Information | Comment |
|---|---|---|---|
| objectClass | M,Y | ManagedEntity.objectClass | See Table 7.4.1.2. |
| objectInstance | M,Y | ManagedEntity.objectInstance | See Table 7.4.1.2. |
| notificationId | M,N | -- | See Table 7.4.1.2. |
| eventTime | M,Y | -- | Notification header - see [3]. It shall carry the ManagedEntity state changed time. |
| systemDN | C,Y | -- | See Table 7.4.1.2. |
| notificationType | M,Y | notifyOperationProgress | |
| reportedOperation | M,Y | <operationType, operationIdentifier> | This allows unique identification of the operation for which progress is reported |
| progressInformation | M,N | Choice of ( Percentage, stepInformaton <numberOfCompletedStep, totalNumberOfSteps> ) | Information about the current progress of the operation |
| estimatedCompletionTime | O,N | -- | Contains the estimated completion time of the reported operation |
| additionalText | O,N | -- | It can contain further information in text on the progress, e.g. text describing the step which was just completed. |
| sourceIndicator | O,N | See Table 7.4.1.2 | See Table 7.4.1.2. |

[3GPP terminology: M stands for Mandatory, O for Optional, Y for Yes-filterable, N for Not filterable; references are within 32.622]

7.9.1.3 Triggering Event 7.9.1.3.1     From-state
progressA.

| Assertion Name | Definition |
|---|---|
| progressA | The operation has progressed to extent A |

7.9.1.3.2     To-state
progressB.

| Assertion Name | Definition |
|---|---|
| progressB | The operation has progressed to extent B>A |

Figure 8

7.10.1 Operation cancelOperation (O) [3GPP terminology: O stands for Optional]

7.10.1.1 Definition
When the IRPManager invokes cancelOperation the IRPAgent shall stop the operation specified in the request as soon as possible.

7.10.1.2 Input parameters

| Parameter Name | Qualifier | Matching Information | Comment |
|---|---|---|---|
| operationToBeCancelled | M | <operationType, operationIdentifier> | This allows unique identification of the operation which shall be cancelled. |

7.10.1.3 Output parameters

| Parameter Name | Qualifier | Matching Information | Comment |
|---|---|---|---|
| status | M | ENUM (Success, partialSuccess, failed) | Summary result of the cancellation |
| additionalInformation | M | String | Information about the cancellation, e.g. list of completed steps, reason for failure etc. |

7.10.1.4 Pre-condition
None specific.

7.10.1.5 Post-condition
None specific.

7.10.1.6 Exceptions
None specific.

PLMN OPERATION MANAGEMENT

FIELD OF SOME EMBODIMENTS

Some embodiments relate to a method and apparatus and in particular but not exclusively to a method and apparatus for PLMN (public land mobile networks) operation management.

BACKGROUND

Some public land mobile networks (PLMN) operate according to a management reference model in which a plurality of lower management functions manage a respective network element or set of closely related types of network elements under the general management of a network management function.

Operations managed by the lower management function are generally performed remotely from the network management function, and it has been found that some operations can take more time than expected to complete.

There has been identified the challenge of providing better control over such operations at the network management function.

SUMMARY

According to an aspect there is provided a method comprising: providing to a network management function of a public land mobile network from another management function of said public land mobile network, one or more notifications of the extent of progress of an operation performed remotely from the network management function, in accordance with one or more input parameters.

The other management function may be a lower management function.

The providing may be via a management interface.

The one or more notifications may be interim notifications.

The operation may be an uncompleted operation.

The providing may be in accordance with the setting of one or more input parameters.

According to another aspect there is provided a method comprising: providing to a network management function of a public land mobile network from a lower management function of said public land mobile network via a management interface, one or more interim notifications of the extent of progress of an uncompleted operation performed remotely from the network management function, in accordance with the setting of one or more input parameters.

According to another aspect there is provided an apparatus comprising: a processor and memory including computer program code, wherein the memory and computer program code are configured to, with the processor, cause the apparatus to: provide to a network management function of a public land mobile network from said apparatus, one or more notifications of the extent of progress of an operation performed remotely from the network management function, in accordance with one or more input parameters.

The other management function may be a lower management function.

The providing may be via a management interface.

The one or more notifications may be interim notifications.

The operation may be an uncompleted operation.

The providing may be in accordance with the setting of one or more input parameters.

According to another aspect there is provided an apparatus comprising: a processor and memory including computer program code, wherein the memory and computer program code are configured to, with the processor, cause the apparatus to: provide to a network management function of a public land mobile network from a lower management function of said public land mobile network via a management interface, one or more interim notifications of the extent of progress of an uncompleted operation performed remotely from the network management function, in accordance with the setting of one or more input parameters.

According to another aspect there is provided a computer program product comprising program code means which when loaded into a computer controls the computer to: provide to a network management function of a public land mobile, one or more notifications of the extent of progress of an operation performed remotely from the network management function, in accordance with one or more input parameters.

According to some embodiments the other management function may be a lower management function.

The providing may be via a management interface.

The one or more notifications may be interim notifications.

The operation may be an uncompleted operation.

The providing may be in accordance with the setting of one or more input parameters.

According to a another aspect there is provided a computer program product comprising program code means which when loaded into a computer controls the computer to: provide to a network management function of a public land mobile network from a lower management function of said public land mobile network via a management interface, one or more interim notifications of the extent of progress of an uncompleted operation performed remotely from the network management function, in accordance with the setting of one or more input parameters.

According to another aspect there is provided a method comprising: receiving at a network management function of a public land mobile network from another management function of said public land mobile network, one or more notifications of the extent of progress of an operation performed remotely from said network management function, in accordance with one or more input parameters.

The other management function may be a lower management function.

The providing may be via a management interface.

The one or more notifications may be interim notifications.

The operation may be an uncompleted operation.

The providing may be in accordance with the setting of one or more input parameters.

According to another aspect there is provided a method comprising: receiving at a network management function of a public land mobile network from a lower management function of said public land mobile network via a management interface, one or more interim notifications of the progress of an uncompleted operation performed remotely from said network management function, in accordance with the setting of one or more input parameters.

According to another aspect there is provided an apparatus comprising: a processor and memory including computer program code, wherein the memory and computer program code are configured to, with the processor, cause the apparatus to: from a management function of said public land mobile network, one or more notifications of the progress of an operation performed remotely from said apparatus, in accordance with one or more input parameters.

The other management function may be a lower management function.

The providing may be via a management interface.

The one or more notifications may be interim notifications.

The operation may be an uncompleted operation.

The providing may be in accordance with the setting of one or more input parameters.

According to another aspect there is provided an apparatus comprising: a processor and memory including computer program code, wherein the memory and computer program code are configured to, with the processor, cause the apparatus to: receive at a network management function of a public land mobile network from a lower management function of said public land mobile network via a management interface, one or more interim notifications of the progress of an uncompleted operation performed remotely from said network management function, in accordance with the setting of one or more input parameters.

According to another aspect there is provided a computer program product comprising program code means which when loaded into a computer controls the computer to: receive from a management function of a public land mobile network, one or more notifications of the progress of an operation performed remotely from said computer, in accordance with one or more input parameters.

The providing may be via a management interface.

The one or more notifications may be interim notifications.

The operation may be an uncompleted operation.

The providing may be in accordance with the setting of one or more input parameters.

According to another aspect there is provided a computer program product comprising program code means which when loaded into a computer controls the computer to: receive at a network management function of a public land mobile network from a lower management function of said public land mobile network via a management interface, one or more interim notifications of the progress of an uncompleted operation performed remotely from said network management function, in accordance with the setting of one or more input parameters.

According to another aspect there is provided means for providing to a network management function of a public land mobile network from another management function of said public land mobile network, one or more notifications of the extent of progress of an operation performed remotely from the network management function, in accordance with one or more input parameters.

The other management function may be a lower management function.

The providing may be via a management interface.

The one or more notifications may be interim notifications.

The operation may be an uncompleted operation.

The providing may be in accordance with the setting of one or more input parameters.

According to another aspect there is provided means for receiving at a network management function of a public land mobile network from another management function of said public land mobile network, one or more notifications of the extent of progress of an operation performed remotely from said network management function, in accordance with one or more input parameters.

The other management function may be a lower management function.

The providing may be via a management interface.

The one or more notifications may be interim notifications.

The operation may be an uncompleted operation.

The providing may be in accordance with the setting of one or more input parameters.

It should be appreciated that any one or more of the following features may be used with any one or more of the above aspects.

The operation may be triggered by said network management function.

The operation may comprise one of: downloading of network element software from a specified location; installation of software at a network element; and activation of network element software that has been downloaded or installed at network element.

The one or more parameters may specify an indicator by which to express said extent of progress.

The indicator may include a numerical indicator or a textual indicator.

The numerical indicator may comprise one of: percentage of completion; number of steps completed out of a total number of steps; and estimated completion time The one or more of said one or more notifications may comprise at least one of: number of steps; and estimated completion time.

The one or more parameters may specify one of the following: length of elapsed time after which to provide said notification; one or more partial completion targets at which to provide said notification; amount of time delay after which to provide said notification.

The technique may further comprise determining at said network management function based on said notification whether or not to cancel said uncompleted operation.

The network management function and said lower management function may both form part of an operations system, and said operation is performed outside of the operations system.

The numerical indicator may comprise one of: percentage of completion; number of steps completed out of a total number of steps; and estimated completion time.

The operation may comprise a download process to an entity other than said network management function.

The lower management function may be an element manager or a domain manager.

BRIEF DESCRIPTION OF FIGURES

A detailed description of embodiments follows hereunder, by way of example only, with reference to the accompanying drawings, in which:

FIGS. 4 and 5 illustrate one implementation example for an interim progress notification technique according to an embodiment of the present invention;

FIG. 7 illustrates an example of input parameters, output parameters, preconditions, post-conditions and exceptions for a cancellation operation to cancel an unfinished operation;

DETAILED DESCRIPTION OF EMBODIMENTS

Figure 1:
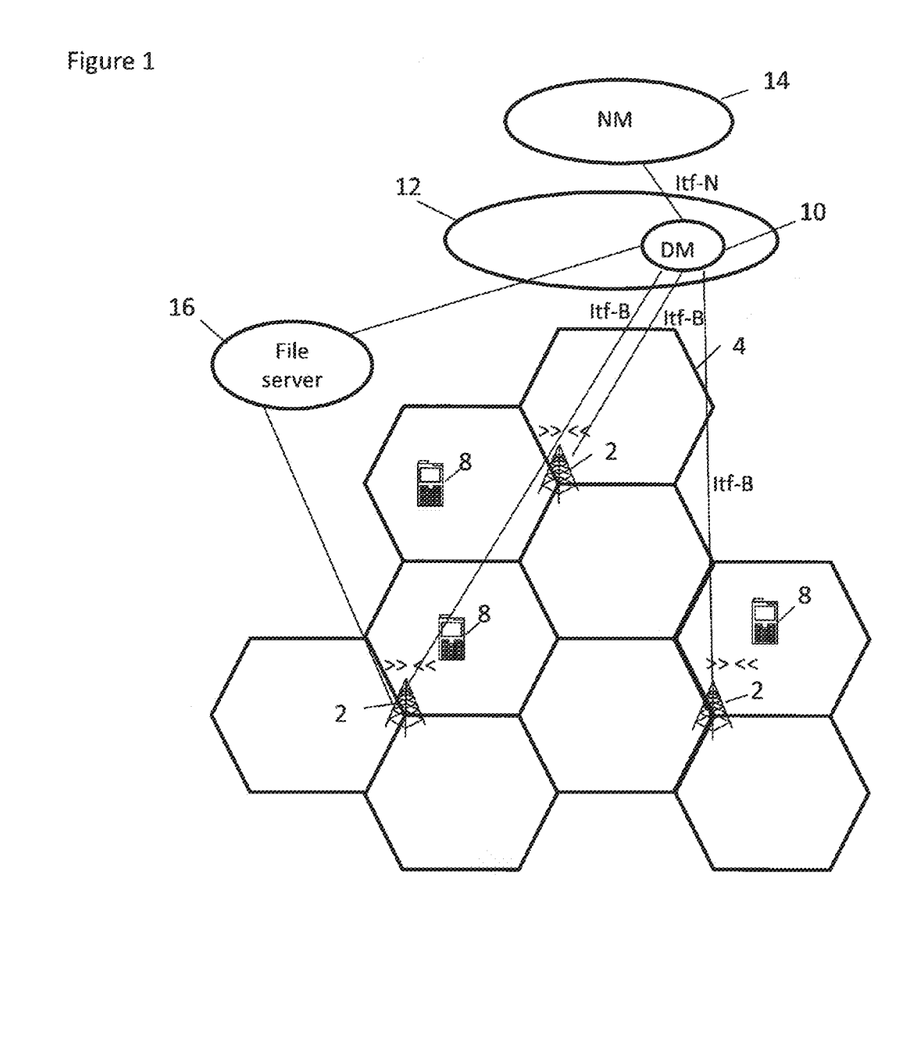
FIG. 1 illustrates an example of a cellular network in which an embodiment of the invention is implemented.

An embodiment of the invention is described below in detail, by way of example only, in the context of a public land mobile network (PLMN) including an evolved UMTS Terrestrial Radio Access Network (EUTRAN) operating in accordance with 3GPP standards. FIG. 1 illustrates part of such a public mobile land network.

The radio access network comprises a plurality of cells 4 with transceivers located at base stations called eNodeBs (eNBs) 2. Only nine cells are shown in FIG. 1, but a radio access network will typically comprise tens of thousands of cells.

A domain/element manager (DM) 10 manages the operation and maintenance (O&M) of all the eNBs of the network under the management of a network manager (NM) 14. DM 10 is part of an element management system (EMS) 12 including other element and/or domain managers controlling other respective network elements or respective sets of closely related types of network elements. The lines between eNBs 2 and DM 10 and the line between DM 10 and NM 14 illustrate management interfaces, which are referred to as Type 1 and Type 2 interfaces, respectively, in 3GPP TS 32.101.

Figure 2:
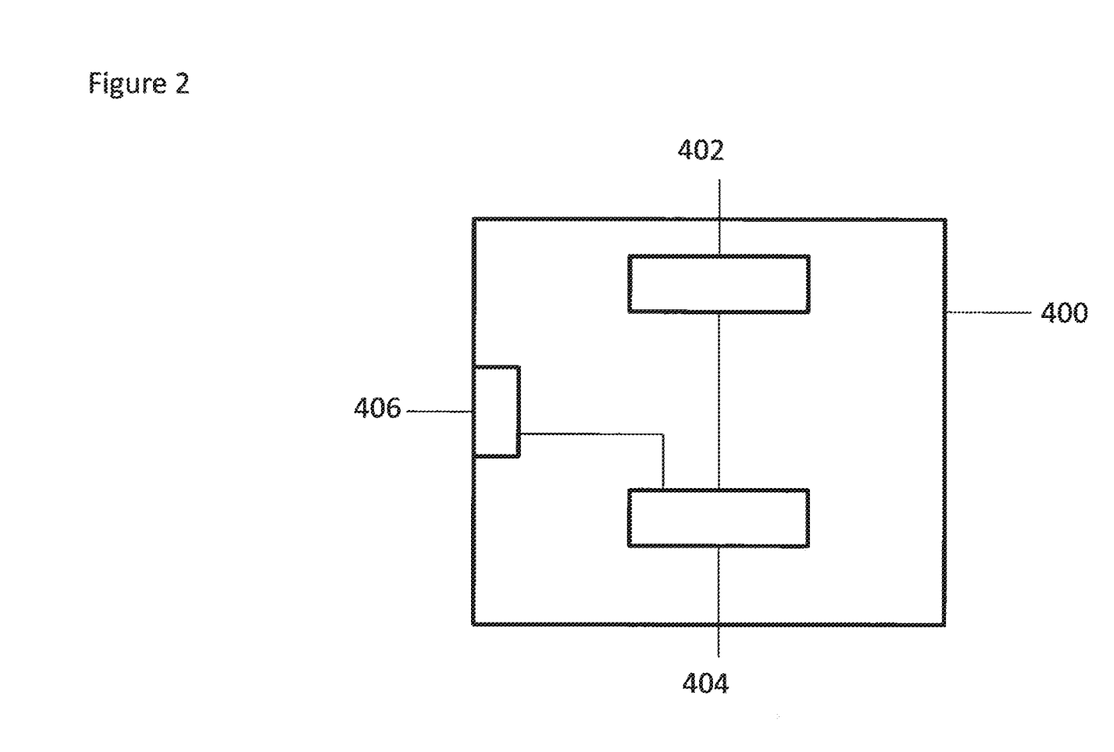
FIG. 2 schematically illustrates an example of an apparatus suitable for use at the network manager of FIG. 1 and the domain manager of FIG. 1.
Figure 3:
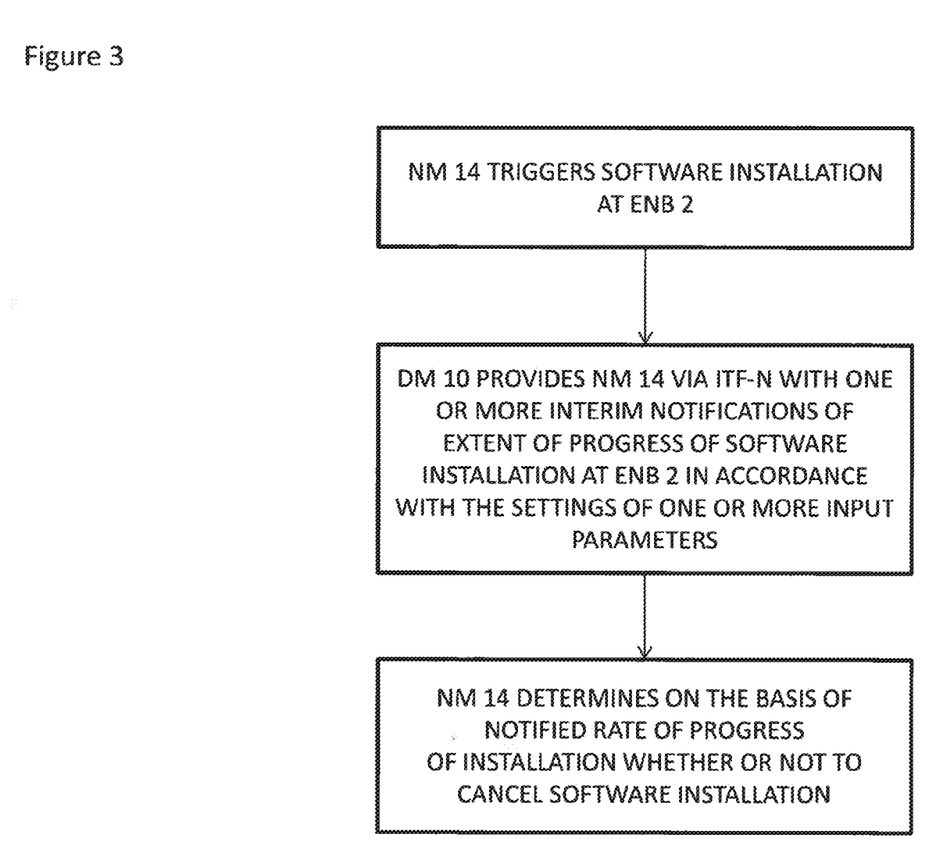
FIG. 3 illustrates an example of operations at the network manager and domain manager of FIG. 1 according to an embodiment of the invention.

FIG. 2 shows an example of the basic elements of apparatus 400 for implementing the Domain Manager 10 and the Network Manager 14. The apparatus 400 includes a memory 402 for receiving and storing data of the kind mentioned below in the description of an embodiment of the present invention, and a data processor 404 for processing data stored in memory 402 and making computations and determinations of the kind mentioned below in the description of an embodiment of the present invention. The apparatus also comprises an interface 406 via which it can send and receive information to and from other network nodes.

It would be appreciated that the apparatus shown in FIG. 2 and described above may comprise further elements which are not directly involved with the embodiments of the invention described hereafter.

An embodiment of the invention is described hereunder for the example of the asynchronous operation of installing at one of the eNBs 2 software that has previously been downloaded from a remote file server 16, which installation is triggered by NM 14. However, the same kind of techniques are also applicable to other operations such as the NM-triggered downloading of said eNB software from said remote file server, and the NM-triggered activation of eNB software downloaded or installed at the request of NM 14.

DM 10 is configured to inform NM 14 via the Itf-N management interface about the progress of the installation according to the settings of one or more input parameters; and NM 14 determines whether or not to cancel the operation according to whether or not the notified extent of progress compares to a predetermined progress rate threshold.

One input parameter specifies how to indicate the extent of progress of the installation. The extent of progress can be indicated by numerical indicators such as the percentage of completion, the number of steps completed out of number of total steps; and the estimated time to completion. Alternatively, the extent of progress can be indicated by a textual indicator that includes a more detailed description about the progress of the installation.

One or more other input parameters specify the timing at which interim notifications are to be made to NM 14, and/or other conditions for making interim progress notifications. Examples are as follows.

One input parameter could be set such that DM 10 makes notifications at specified intervals of time.

One input parameter could be set such that DM 10 makes a notification to NM 14 whenever there has been a predefined percentage increase (such as e.g. 10%) towards completion of the operation (software installation). For the example of 10%, DM 10 would make notifications to NM at 10% completion, 20% completion, 30% completion, and so on.

One input parameter could be set such that DM 10 makes a notification every time the completion percentage reaches each of a plurality of predefined values, which are not necessarily equally spaced. For example, the setting could be that DM 10 makes a progress notification to NM when the completion percentage reaches 10%, 25%, 80% and 90%.

One input parameter could be set such that DM 10 if the estimated completion time is later than a specified point in time. For example, the setting could be that DM 10 makes a progress notification to NM 14 only if the completion time is later than 5 pm on 25 Dec. 2011.

One input parameter could set other conditions for making progress notifications. For example, one input parameter could specify that progress notifications are only made at all for operations for which the number of steps is a predetermined minimum number of steps or greater. For example, the setting could be that DM 10 only makes interim progress notifications to NM 14 for operations involving 10 or more steps.

One input parameter could be set such that DM 10 makes a progress notification to NM 14 whenever the number of completed steps reaches each of a plurality of predefined values. For example, the setting could be that DM 10 makes interim progress notifications to NM 14 when the number of completed steps reaches 1, 5, 20 and 21.

One input parameter could specify whether or not each step should be reported. A "YES" setting for this parameter would cause DM 10 to make an interim progress notification to NM 14 upon completion of each and every one of the steps that constitutes the operation.

The above notification technique could be implemented by adding input and output parameters to the operation described at Section 5.8 of 3GPP 32.532 for initiating installation of a network element software entity which has previously been downloaded at the request of NM 14.

The revised set of input and output parameters for this operation according to an embodiment of the present invention are shown in FIG. 4.

For the above-mentioned operations of downloading eNB software from a specified location or activating downloaded or installed eNB software, the same kind of input and output parameters can be added to the operations described at Sections 5.7.1 and 5.7.2 of 3GPP 32.532.

The notification of the kind illustrated in FIG. 5 has a separate name for each operation type, and is further characterised by the identifying parameter having a specific name.

FIG. 5 illustrates an example of input parameters and triggering events for a notification generated by DM 10 about the progress of an operation to install eNB software. The same kind of input parameters and triggering events can also be used for notifications generated by DM 10 about the progress of other operations such as the downloading of eNB software or the activation of downloaded or installed eNB software.

The technique of the kind illustrated in FIGS. 4 and 5 is one in which progress indication control is done individually on a per operation basis, i.e. the notification has a separate name for each operation type and the identifying parameter has a separate name.

Figure 6:
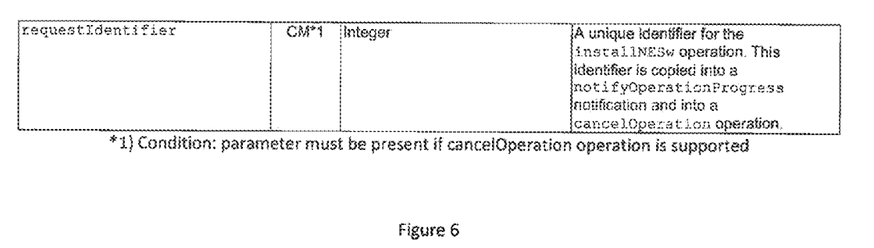
FIG. 6 illustrates an example of an additional input parameter for use as an input parameter for a cancellation operation to cancel an unfinished operation.

FIGS. 6 and 7 illustrate one implementation example for facilitating the cancellation of an unfinished software installation operation in the event that the installation operation is determined by NM 14 to be taking too long. FIG. 6 illustrates an additional input parameter for the set of parameters of FIG. 4. The requestIdentifier parameter of FIG. 6 is used as an input parameter for a cancellation operation whose input parameters, output parameters, pre-condition, post-condition and exceptions are illustrated in FIG. 7.

The cancel operation illustrated in FIG. 7 is characterised by an identifying parameter having a specific name.

FIGS. 6 and 7 relate to the example of a software installation operations, but the same kind of technique can also be used for cancelling other operations such as the downloading of eNB software or the activation of downloaded or installed eNB software.

Figure 8:
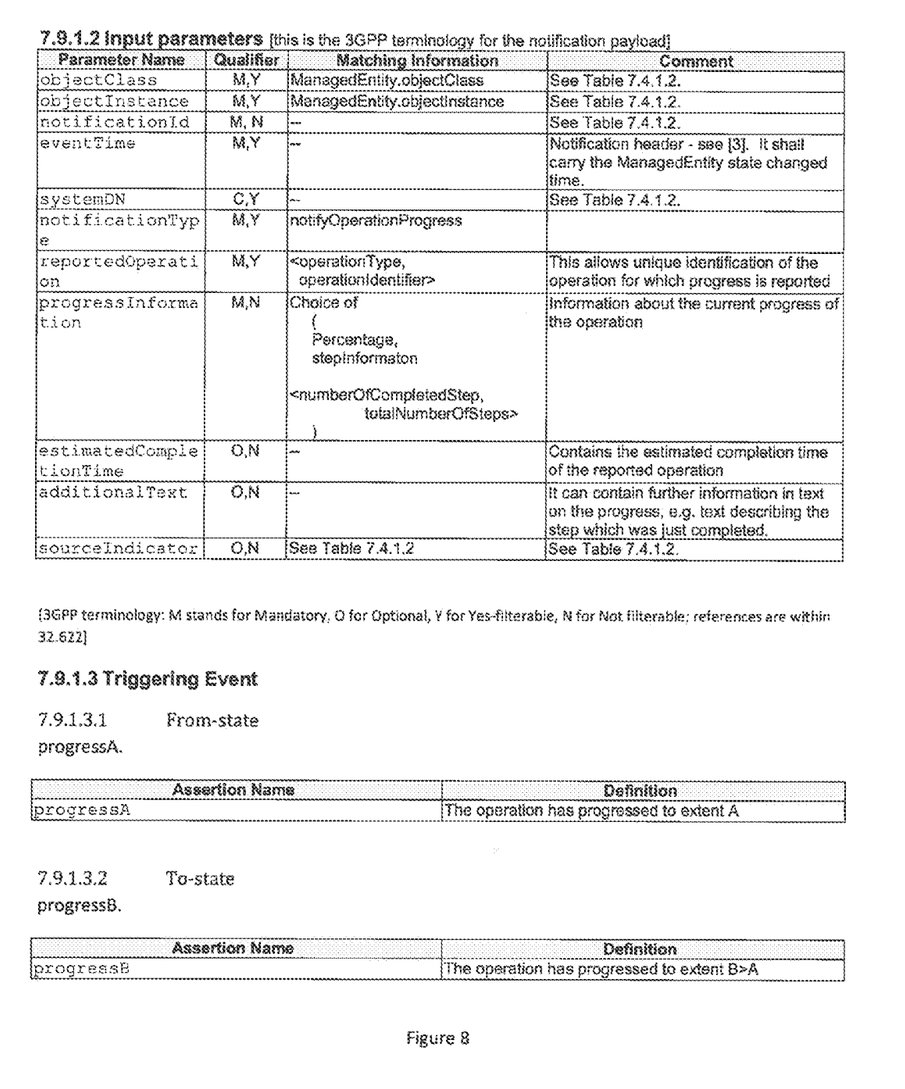
FIG. 8 illustrates another implementation example for an interim progress notification technique according to an embodiment of the present invention.

FIG. 8 illustrates another example of implementing an interim progress notification technique according to the present invention, more generally for any operation relating to a managed object managed by an element manager (EM) or domain manager (DM) under the upper management of NM 14. Examples of managed objects include devices, systems, or anything else requiring some sort of management and monitoring. Specific examples include: routers, concentrators, hosts, servers and application such as mail. A managed object is not necessarily a piece of hardware; it can be anything that provides a function or service.

The implementation example shown in FIG. 8 for notifying NM 14 about the progress of an operation is an addition to the set of event notifications described at Sections 7.4 to 7.8 of 3GPP TS 32.662. The triggering event for notification is progress of the operation from a pre-set lower extent A to a pre-set higher extent B.

One way of controlling the timing of the progress notification in this implementation example is to define a specific information object class which holds information about the controlling parameters. These parameters could be set respectively for each operation type or set commonly for all types of operations.

The progress notification of FIG. 8 is a generic notification which carries the operation type as its own parameter, and for which the identifying parameter has a generic name.

Figure 9:
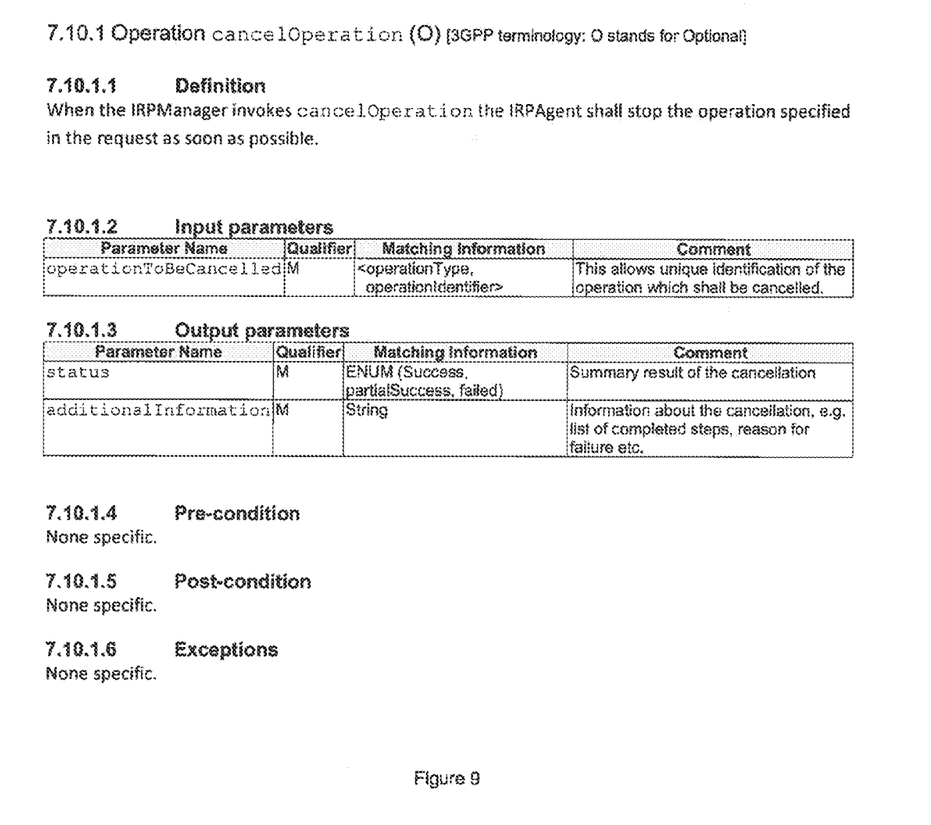
FIG. 9 illustrates an implementation example for an operation cancellation technique according to an embodiment of the present invention.

Another implementation example for a cancel operation to cancel an incomplete operation is shown in FIG. 9. The input parameter specifies the operation to be cancelled, and the output parameters specify the result of the cancellation as summary (e.g. success, partial success, or failure) and additional information about the cancellation such as a list of completed steps, reason for failure etc. The cancel operation of FIG. 9 also has the operation type as its own parameter, and is further characterised by the identifying parameter having a generic name.

Another alternative example for implementing notifications about operation progress is to provide an object class operation that holds an attribute indicating the progress, which could be read or which could be configured to send out notifications about changes in the value of the attribute. For an actual operation an instance of this operation object class is created. The creation of this instance is triggered by the reception at the DM. Similarly, another alternative example for implementing the cancellation of an operation is to provide the possibility to delete the instance of such an operation object class when there is a decision to cancel the one operation represented by that operation object class instance.

The above-described operations may require data processing in the various entities. The data processing may be provided by means of one or more data processors. Similarly various entities described in the above embodiments may be implemented within a single or a plurality of data processing entities and/or data processors. Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a server.

For example, the embodiments of the invention may be implemented as a chipset, in other words a series of integrated circuits communicating among each other. The chipset may comprise microprocessors arranged to run code, application specific integrated circuits (ASICs), or programmable digital signal processors for performing the operations described above.

Embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the modifications explicitly mentioned above, it will be evident to a person skilled in the art that various other modifications of the described embodiment may be made within the scope of the invention.

The invention claimed is:
1. A method comprising:
electronically communicating to a network management entity of a public land mobile network by another management entity of said public land mobile network, one or more notifications of the extent of progress of an operation performed remotely from the network management entity at a network element, in accordance with one or more input parameters, wherein the one or more input parameters specify one or more partial completion targets at which to provide said notification, and wherein the one or more input parameters are obtained by downloading of a network element software from a specified location, installing of the software at the network element, and activating of the network element software that has been downloaded or installed at the network element; and cancelling by the network management entity an uncompleted operation, in response to the one or more notifications, when the extent of progress fails to meet a predetermined progress rate threshold, wherein the uncompleted operation occurs in the network element.

2. A method as claimed in claim 1, wherein said another management entity is a lower management entity.

3. A method as claimed in claim 1, wherein said notifications comprise interim notifications.

4. A method as claimed 1, wherein said operation is triggered by said network management entity.

5. A method as claimed in claim 1, wherein said operation comprises one of: downloading of network element software from a specified location, installation of software at a network element, and activation of network element software that has been downloaded or installed at network element.

6. A method as claimed in claim 1, wherein said one or more parameters specify an indicator by which to express said extent of progress.

7. A method as claimed in claim 6, wherein said indicator includes a numerical indicator or a textual indicator.

8. A method as claimed in claim 1, wherein said one or more of said one or more notifications comprises at least one of: number of steps, and estimated completion time.

9. A method as claimed in claim 1, wherein said one or more parameters further specify one of the following: length of elapsed time after which to provide said notification; amount of time delay after which to provide said notification.

10. A method comprising:
receiving at a network management entity of a public land mobile network electronically communicated by another management entity of said public land mobile network, one or more notifications of the extent of progress of an operation performed remotely from said network management entity at a network element, in accordance with one or more input parameters, wherein the one or more input parameters specify one or more partial completion targets at which to provide said notification, and wherein the one or more input parameters are obtained by downloading of a network element software from a specified location, installing of the software at the network element, and activating of the network element software that has been downloaded or installed at the network element;

determining at the network management entity whether to cancel an uncompleted operation, in response to the one or more notifications, when the extent of progress fails to meet a predetermined progress rate threshold, wherein the uncompleted operation occurs in the network element.

11. An apparatus comprising:
a processor; and
a memory including computer program code, wherein the memory and computer program code are configured to, with the processor, cause the apparatus to:

provide to a network management entity of a public land mobile network from said apparatus, one or more notifications of the extent of progress of an operation performed remotely from the network management entity at a network element, in accordance with one or more input parameters, wherein the one or more input parameters specify one or more partial completion targets at which to provide said notification, and wherein the one or more input parameters are obtained by downloading of a network element software from a specified location, installing of the software at the network element, and activating of the network element software that has been downloaded or installed at the network element; and cancel by the network management entity an uncompleted operation, in response to the one or more notifications, when the extent of progress fails to meet a predetermined progress rate threshold, wherein the uncompleted operation occurs in the network element.

12. An apparatus as claimed in claim 11, wherein said one or more of said one or more notifications comprises at least one of: number of steps; and estimated completion time.

13. An apparatus comprising:
a processor; and
a memory including computer program code, wherein the memory and computer program code are configured to, with the processor, cause the apparatus to:

receive from a management entity of said public land mobile network, one or more notifications of the progress of an operation performed remotely from said apparatus at a network element, in accordance with one or more input parameters, wherein the one or more input parameters specify one or more partial completion targets at which to provide said notification, and wherein the one or more input parameters are obtained by downloading of a network element software from a specified location, installing of the software at the network element, and activating of the network element software that has been downloaded or installed at the network element; and determine at the management entity whether to cancel an uncompleted operation, in response to the one or more notifications, when the extent of progress fails to meet a predetermined progress rate threshold, wherein the uncompleted operation occurs in the network element.

14. An apparatus as claimed in claim 13, wherein said one or more of said one or more notifications comprises at least one of: number of steps; and estimated completion time.

15. A computer program product embodied in a non-transitory computer-readable medium and encoding instructions that, when executed in hardware, perform a process, the process comprising:

providing to a network management entity of a public land mobile, one or more notifications of the extent of progress of an operation performed remotely from the network management entity at a network element, in accordance with one or more input parameters, wherein the one or more input parameters specify one or more partial completion targets at which to provide said notification, and wherein the one or more input parameters are obtained by downloading of a network element software from a specified location, installing of the software at the network element, and activating of the network element software that has been downloaded or installed at the network element; and cancelling by a network management entity an uncompleted operation, in response to the one or more notifications, when the extent of progress fails to meet a predetermined progress rate threshold, wherein the uncompleted operation occurs in the network element.

16. A computer program product as claimed in claim 15, wherein said one or more of said one or more notifications comprises at least one of: number of steps; and estimated completion time.

17. A computer program product embodied in a non-transitory computer-readable medium and encoding instructions that, when executed in hardware, perform a process, the process comprising:

receiving from a management entity of a public land mobile network, one or more notifications of the progress of an operation performed remotely from said computer at a network element, in accordance with one or more input parameters, wherein the one or more input parameters specify one or more partial completion targets at which to provide said notification, and wherein the one or more input parameters are obtained by downloading of a network element software from a specified location, installing of the software at the network element, and activating of the network element software that has been downloaded or installed at the network element;

determining at the network management entity whether to cancel an uncompleted operation, in response to the one or more notifications, when the extent of progress fails to meet a predetermined progress rate threshold, wherein the uncompleted operation occurs in the network element.

18. A computer program product as claimed in claim 17, wherein said one or more of said one or more notifications comprises at least one of: number of steps; and estimated completion time.

* * * * *